United States Patent [19]

Gawell et al.

[11] Patent Number: 5,216,412
[45] Date of Patent: Jun. 1, 1993

[54] DISPLAY MONITOR IMAGE SIZE REGULATION

[75] Inventors: George R. Gawell, Mt. Prospect; Philip J. Nowaczyk, Chicago, both of Ill.

[73] Assignee: Zenith Electronics Corporation, Glenview, Ill.

[21] Appl. No.: 620,504

[22] Filed: Nov. 30, 1990

[51] Int. Cl.$^5$ ............................................. G07G 1/06
[52] U.S. Cl. ..................................... 340/720; 340/731; 358/243
[58] Field of Search ................ 340/720, 723, 731; 358/74, 243; 315/408

[56] References Cited

U.S. PATENT DOCUMENTS

| 4,574,224 | 3/1986 | Nowaczyk | 358/243 |
| 4,788,618 | 11/1988 | Kimura | 358/243 |
| 4,801,852 | 1/1989 | Kashiwagi | 358/243 |
| 4,812,719 | 3/1989 | Stephens et al. | 358/243 |

Primary Examiner—Ulysses Weldon
Assistant Examiner—M. Fatahiyar

[57] ABSTRACT

A display monitor includes a conventional CRT and associated display drive circuitry together with conventional horizontal and vertical deflection systems. A high voltage system is operated in response to the horizontal deflection system to produce a CRT accelerating potential. A display size control responds to changes of high voltage system current to produce an error signal which is used to produce compensating amplitude changes of vertical and horizontal deflection currents in order to maintain substantially constant image size.

5 Claims, 2 Drawing Sheets

DISPLAY MONITOR IMAGE SIZE REGULATION

CROSS REFERENCE TO RELATED APPLICATION

This application is related to a copending application entitled Horizontal Scan Modulator Having Size Selection filed Sep. 17, 1990 and having Ser. No. 07/583,789 which is assigned to the assignee of the present application and which is incorporated herein by reference.

FIELD OF THE INVENTION

This invention relates generally to cathode ray tube display systems and particularly to those used in computing systems and television receivers.

BACKGROUND OF THE INVENTION

Computing systems generally use one or more display monitors to provide a visual input/output capability. Such display monitors are similar in many respects to conventional television receiver displays. Thus, many technologies, including the present invention, may be applied effectively to both. In both systems, a cathode ray tube (CRT) includes an evacuated envelope usually made of high-strength glass. The envelope includes a generally flat or slightly curved faceplate or viewing screen together with a funnel shaped bell and extending neck. The interior side of the faceplate supports a phosphor screen. In monochrome displays, a single electron gun is supported within the CRT neck and is directed toward the phosphor screen. The electron gun produces a beam of electrons which are directed toward the faceplate striking the phosphor screen and causing visible light to be emitted therefrom. In color display systems, a plurality of electron guns are used together with a phosphor screen which supports plural areas of phosphors having differing color light emitting characteristics. A shadow mask or similar structure is interposed between the electron guns and the phosphor screen to cause each of the electron guns to stimulate an associated type of colored light emitting phosphor.

Whether the display system is monochrome or color, the electrons emanating from the electron gun or guns form a CRT beam which is scanned in both the horizontal and vertical directions across the faceplate to form a raster. In most instances, the horizontal scan system is operative at a higher frequency than the vertical scan system. Thus, the horizontal scan moves the electron beam rapidly from side to side across the faceplate while the vertical scan system causes the successive horizontal scans to be moved progressively from top to bottom to complete a display frame and form the raster.

In the majority of the presently used display systems, electron beam scanning is accomplished by electromagnetic deflection of the CRT beam. A deflection yoke is supported upon the CRT envelope between the electron guns and the faceplate. The deflection yoke supports a plurality of deflection coils which are coupled to the horizontal and vertical scan systems. Horizontal and vertical scan signals provided by the respective scan systems are coupled to the windings of the deflection yoke to produce corresponding electromagnetic fields which bend the electron beam and thereby direct it to the desired portion of the CRT faceplate. Both the horizontal and vertical scan signals include longer duration sloped scan portions followed by shorter duration high amplitude retrace portions. The latter are utilized at the completion of each respective scan interval to return the electron beam to its starting position. In addition, the retrace portion of the horizontal scan signal is used to develop the high voltage necessary to accelerate the electron beam toward the CRT faceplate.

The character of the image displayed in a CRT display system results from variation or modulation of the intensity of the scanned CRT electron beam. This intensity modulation must be properly timed or synchronized to the horizontal and vertical rate scanning of the raster. Thus, as the electron beam is scanned across the faceplate to form a raster, the desired portions of the faceplate are illuminated by synchronized modulation of the electron beam to provide the desired image.

One of the problems associated with CRT displays arises from the relationship between CRT beam current intensity, high voltage power, and deflection sensitivity. As CRT beam current intensity changes, the loading imposed upon the high voltage power system is also changed which in turn causes an inverse change in the high voltage potential. As high voltage potential is changed, the degree of electron beam bending which results from the electromagnetic fields of the deflection yoke (deflection sensitivity) is also changed. For example, an increase in CRT beam current imposes a greater load upon the high voltage system causing a reduction of high voltage potential. The reduction of high voltage potential produces a corresponding increase in deflection sensitivity (more electron beam bending) which in turn causes the raster to be enlarged or "bloom". Because the CRT beam current intensity modulation is synchronized to the horizontal and vertical scan, the displayed image is undesirably enlarged as the raster blooms.

In the event the changes in beam current exist for relatively long time intervals (e.g. several vertical scan periods), the entire raster becomes expanded and the displayed image is correspondingly enlarged. While this general enlargement of the display may be annoying, an even more deleterious effect results from abrupt relatively short term changes in beam current. Such shorter duration beam current changes cause localized or partial blooming and display enlargement. The result is that portions of the displayed image are expanded or shifted with respect to the remaining image elements.

To meet the difficulties associated with raster blooming in response to beam current changes, practitioners in the art have usually attempted to "stiffen" or regulate the high voltage generating system and render it less sensitive to beam current changes. The detailed structure of such systems varies substantially. However, all generally include some means for sensing CRT beam current and regulating the high voltage power in a compensating manner. The objective is to increase high voltage power as beam current increases, thereby maintaining a relatively constant high voltage. To the extent the high voltage potential is maintained constant, the above-described changes in deflection sensitivity in response to beam current and the resulting raster blooming are avoided.

An alternate approach to CRT beam current compensation involves compensatory scan amplitude changes to maintain image size. One such system uses a series power resistor interposed between the horizontal and vertical scan systems and their supplies of operating voltage. The objective of this approach, known as partial decoupling, is to tolerate high voltage changes as well as raster blooming and make compensating changes in the magnitudes of horizontal and vertical scan during raster blooming.

While the foregoing improvements provide some benefit in responding to the problem of raster blooming, they tend to be complex, expensive and/or inefficient. High voltage regulation requires a substantial reserve or excess of high voltage power and expensive regulation components. Partial decoupling of the deflection systems requires one or more power resistors and wastes substantial energy. In addition, the partial decoupling approach is further limited by the generally slow response of scan amplitude to CRT beam currents. As a result, changes of deflection amplitude do not properly track or correspond to changes of CRT beam current.

There remains, therefore, a need in the art for an inexpensive, efficient display size control system which effectively compensates for changes in CRT beam current intensity.

Accordingly, it is a general object of the present invention to provide an improved display system. It is a more particular object of the present invention to provide an improved display system which substantially maintains image size despite changes in image intensity. It is a still more particular object of the present invention to provide an improved display system which is efficient and relatively inexpensive.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
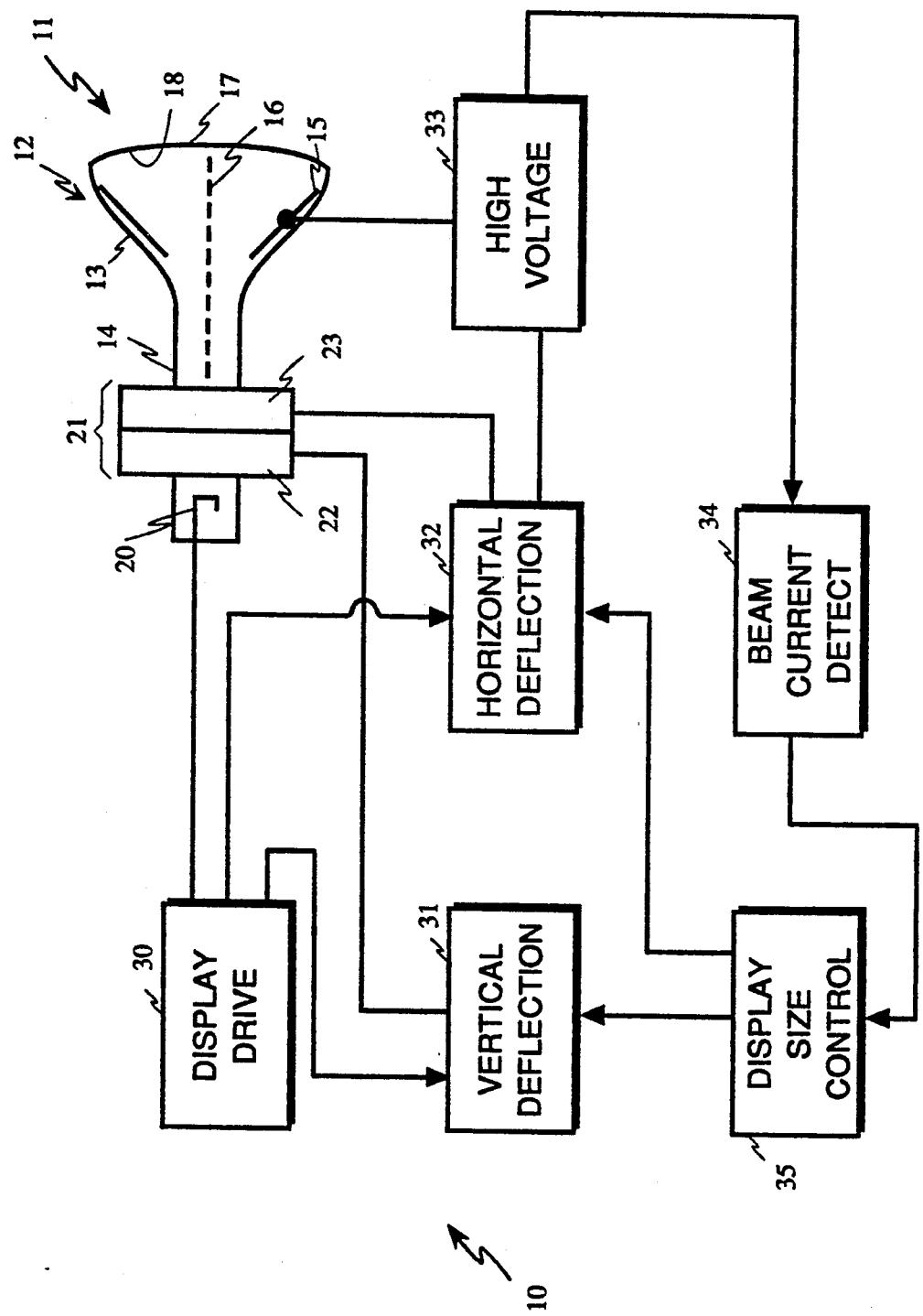
FIG. 1 sets forth a block diagram of a display monitor image size regulation system constructed in accordance with the present invention.

FIG. 1 sets forth a block diagram of a display monitor constructed in accordance with the present invention and generally referenced by numeral 10. Display monitor 10 includes a conventional cathode ray tube 11 having an evacuated envelope 12 which includes a faceplate 17, a tapered funnel 13 and an elongated neck portion 14. In accordance with conventional fabrication techniques, an electron gun 20 is supported within neck 14 and is directed toward faceplate 17. A conventional high voltage electrode 15 is supported within envelope 12. A display drive 30 also constructed in accordance with conventional fabrication techniques includes circuitry for producing the video signals applied to electron gun 20 of CRT 11. A conventional yoke assembly 21 having a vertical deflection yoke 22 and a horizontal yoke 23 is supported upon envelope 12 and produces electromagnetic deflection fields within CRT 11. A vertical deflection system 31 is coupled to vertical yoke 22 and to display drive 30. A horizontal deflection system 32 is coupled to horizontal yoke 23 and to display drive 30. A high voltage system 33 is coupled to high voltage electrode 15 and horizontal deflection system 32. A display size control 35 constructed in accordance with the present invention and described below in greater detail is coupled to vertical deflection system 31 and horizontal deflection system 32. A beam current detector 34 is coupled to high voltage system 33 and to display size control 35 in the manner set forth below in greater detail.

In operation, display drive 30, in accordance with conventional fabrication techniques, causes electron gun 20 to produce an intensity modulated stream of electrons formed into a CRT beam current 16. Electron beam 16 is directed toward faceplate 17 and phosphor screen 18 supported thereon. The electrons within CRT beam 16 are accelerated toward faceplate 17 by the high voltage present on electrode 15 and produce visible light as they strike phosphor screen 18. Horizontal deflection system 32 produces conventional horizontal scan signals which when applied to yoke 23 produce corresponding electromagnetic fields which in turn are operative upon CRT beam 16 causing side to side deflection thereof. As mentioned above, the horizontal scanning of CRT beam 16 causes it to be repeatedly scanned across faceplate 17 and retraced to its initial starting position. Vertical deflection system 31 produces vertical scan signals which are applied to vertical yoke 22 to produce corresponding electromagnetic fields within envelope 12 and deflect CRT beam 16 vertically between the top and bottom of faceplate 17. As is also described above, the vertical deflection of CRT beam 16 occurs more slowly than horizontal scan causing successive horizontal scans to progress downwardly with respect to faceplate 17 and to produce a scanned raster. Horizontal deflection 32 also produces a high amplitude short duration retrace pulse which is coupled to high voltage 33 and utilized to provide a high voltage accelerating potential at electrode 15. The purpose of the high voltage at electrode 15 is to provide the above-referenced acceleration of the electrons within CRT beam 16.

Thus, display drive 30, vertical deflection system 31, horizontal deflection system 32, high voltage system 33 and yoke 21 cooperate in accordance with conventional fabrication techniques to produce a scanned raster upon faceplate 17 of CRT 11. In further accordance with the process described above, display drive 30 also provides intensity modulation of CRT beam 16 to impart the desired image character to the image formed on faceplate 17. The proper display of the desired image is dependent, in part, upon the correct timing between the intensity modulations of CRT beam 16 and the vertical and horizontal scanning process. To facilitate this timing, synchronizing signals are produced by display drive 30 and applied to vertical deflection system 31 and horizontal deflection system 32.

In accordance with conventional operation, high voltage system 33 is in effect the "power supply" for CRT 11. As a result, the energy used to maintain the accelerating potential by high voltage circuit 33 is directly related to the intensity of CRT beam 16. Thus, by means set forth below, beam current detector 34 senses changes in the intensity of CRT beam 16 by sensing corresponding changes in the load upon high voltage system 33 and its current draw. Display size control 35, by means set forth below, responds to these detected changes of operating power drawn by high voltage system 33 as CRT beam current changes and alters the operation of horizontal deflection system 32. Because the compensating changes of scan signal amplitude required for CRT beam current changes can be accurately determined, size control 35 is able to make compensating horizontal image size changes. Concurrently, display size control 35 also changes the amplitude of vertical scan signal produced by vertical deflection 31 in response to detected changes in CRT beam current.

Therefore, in summary, as CRT beam 16 increases, an increased load is imposed upon high voltage system 33 which is reflected as an increased power consumption. This increased operating power consumption by high voltage system 33 is detected by beam current detector 34 and applied to display size control 35 which produces a compensating error signal which is applied to horizontal deflection system 32 and vertical deflection system 31 causing a corresponding reduction in the amplitude of horizontal and vertical scan signals. With lower amplitude scan signals applied to horizontal yoke 23 and vertical yoke 22, reduced deflection energy is applied to CRT beam 16 which compensates for the reduction of high voltage.

Conversely, in the event CRT beam 16 decreases, the load imposed upon high voltage system 33 is reduced which in turn is reflected as a reduction of power consumed by horizontal deflection system 32. In response, display size control 35 produces an error signal which increases output voltage which in turn increases the amplitude of horizontal scan and vertical signals produced. With increased amplitude scan signals applied to horizontal yoke 23 and vertical yoke 22, the size of the scanned raster on CRT 11 is maintained despite the increase of high voltage potential due to the reduction of CRT beam current.

Figure 2:
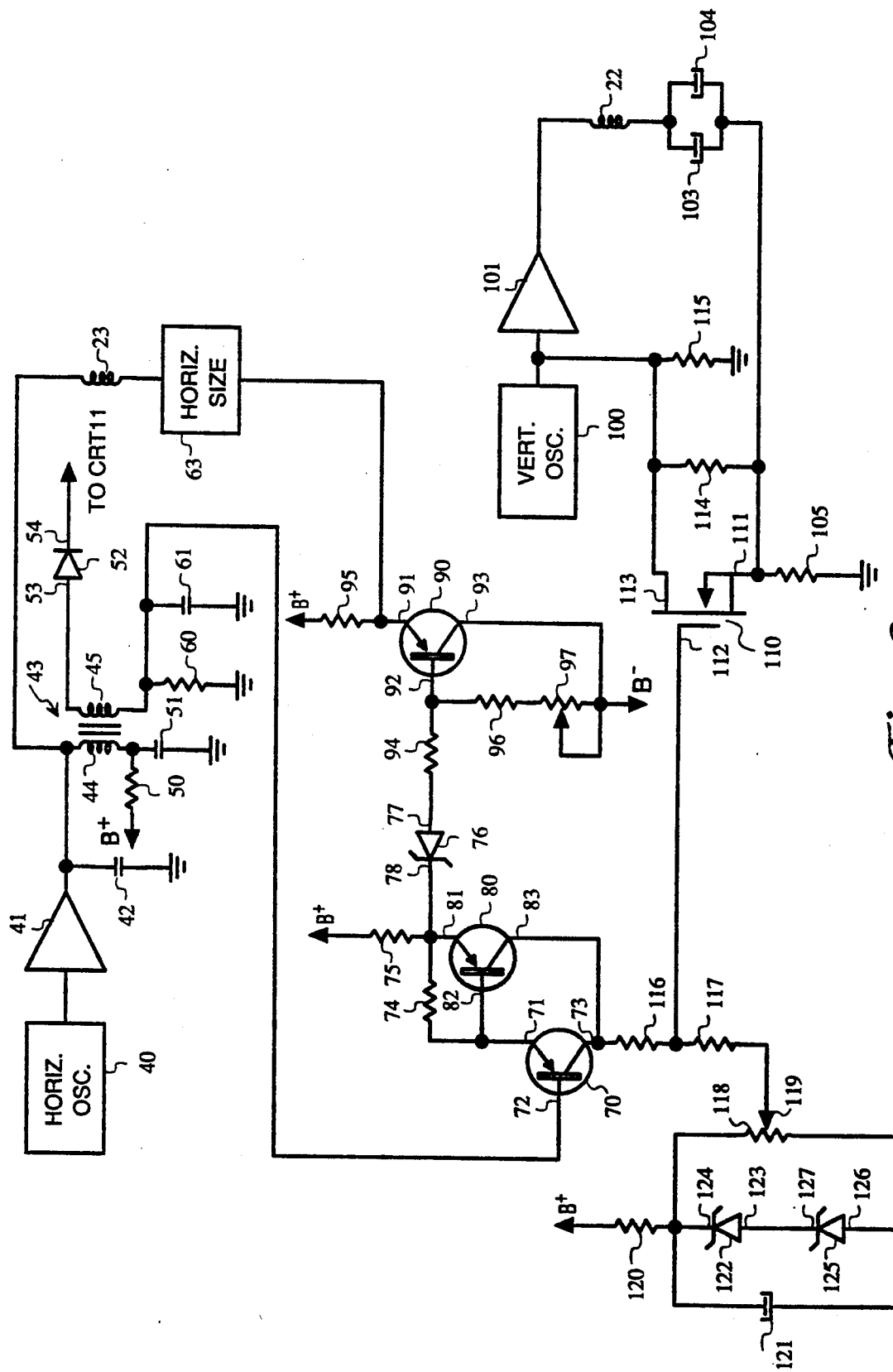
FIG. 2 sets forth a partial schematic, partial block diagram of the present invention display monitor image size regulation system.

FIG. 2 sets forth a partial schematic partial block diagram of the present invention display monitor image size regulation system. The horizontal oscillator 40, constructed in accordance with conventional fabrication techniques, is coupled to a horizontal output stage 41. The output of horizontal stage 41 is coupled to a primary winding 44 of a horizontal output transformer 43. Winding 44 is coupled to a source of operating supply voltage by a resistor 50 and to ground by a capacitor 51. A tuning capacitor 42 is coupled between the output of stage 41 and ground. Horizontal output transformer 43 includes a secondary winding 45 coupled at one end to ground by a resistor 60 and a parallel capacitor 61. A high voltage rectifier 52 includes an anode 53 coupled to the remaining end of primary transformer winding 45 and a cathode 54 coupled to CRT 11 (shown in FIG. 1). A horizontal deflection yoke 23 constructed in accordance with conventional fabrication techniques is coupled to the output of amplifier 41.

A PNP transistor 70 includes an emitter 71, a base 72 coupled to the junction of resistor 60 and primary winding 45, and a collector 73. A PNP transistor 80 includes an emitter 81 coupled to a source of operating supply by a resistor 75, a base 82 coupled to emitter 71 of transistor 70, and a collector 83 coupled to collector 73 of transistor 70. A resistor 74 is coupled between emitter 71 of transistor 70 and emitter 81 of transistor 80. A PNP transistor 90 includes an emitter 91 coupled to a source of operating supply voltage by a resistor 95, a base 92, and a collector 93 coupled to a source of negative operating supply. A resistor 96 and an adjustable resistor 97 are coupled in series between base 92 of transistor 90 and a source of negative operating supply. A zener diode 76 includes an anode 77 coupled to base 92 by a resistor 94 and a cathode 78 coupled to emitter 81 of transistor 80. A horizontal size control 63 is coupled between horizontal yoke 23 and emitter 91 of transistor 90.

A vertical oscillator 100 constructed in accordance with conventional fabrication technique is coupled to a vertical amplifier 101. A vertical yoke 22 is coupled to the output of amplifier 101 and to a parallel pair of capacitors 103 and 104. A field effect transistor 110 includes a source electrode 111 coupled to ground by a resistor 105, a gate electrode 112 coupled to collector 73 of transistor 70 by a resistor 116, and a drain electrode 113 coupled to vertical oscillator 100. A resistor 114 is coupled between source electrode 111 and drain electrode 113 of field effect transistor 110. A resistor 115 is coupled between drain electrode 113 and ground.

A potentiometer 118 and a resistor 120 are serially coupled between ground and B-plus. Potentiometer 118 includes a movable contact 119 which is coupled to gate 112 of field effect transistor 110 by a resistor 117. A capacitor 121 is coupled in parallel with potentiometer 118. A zener diode 122 includes an anode 123 and a cathode 124 coupled to the junction of resistor 120 and potentiometer 118. A zener diode 125 includes an anode 126 coupled to ground and a cathode 127 coupled to anode 123 of zener diode 122. Zener diodes 122 and 125 provide a compensating temperature characteristic for field effect transistor 110.

In operation, horizontal oscillator 40 functions in accordance with conventional fabrication techniques to provide a horizontal deflection rate scan signal which is coupled to horizontal output stage 41. Output stage 41 functions essentially as a switching circuit and alternate between conducting and nonconducting states to energize horizontal yoke 23 and primary winding 44 of high voltage transformer 43. As described above and in accordance with conventional fabrication techniques, the resulting currents within yoke 23 caused by the switching operation of output amplifier 41 produce deflection currents within yoke 23 characterized by a linearly increasing scan portion and a high amplitude short duration retrace pulse signal. Concurrently, the switching operation of output amplifier 41 produce similar currents within primary winding of high voltage transformer 43. In further accordance with conventional fabrication techniques, the tuning and winding ratios of primary winding 44 and secondary winding 45 of high voltage transformer 43 are configured and selected to induce an increased amplitude retrace pulse within secondary 45. This high amplitude pulse is rectified by high voltage rectifier 52 to produce the above-described CRT electron beam accelerating potential. Horizontal size control 63 may be constructed in accordance with conventional fabrication techniques and is operative to control the amplitude of deflection currents within yoke 23. In its preferred form, however, horizontal size control 63 is fabricated in accordance with the structure set forth in the above-referenced incorporated application entitled Horizontal Scan Modulator Having Size Selection. In either event, the essential feature relating to the present invention for horizontal size control 63 is that size control 63 be responsive to a control voltage applied by the present invention as set forth below in greater detail.

Vertical oscillator 100 is constructed in accordance with conventional fabrication techniques and produces vertical deflection rate scan signals which are amplified by output amplifier 101 and applied to vertical deflection yoke 22. The application of vertical rate deflection signals to yoke 22 produces the required vertical rate deflection currents within yoke 22 for vertical scanning of CRT 11.

Thus, the operation of the system shown in FIG. 2 as described thus far is more or less in accordance with conventional techniques and provides for the above-described vertical and horizontal scanning of CRT 11 as well as the supply of the required high voltage electron beam accelerating potential. With attention now to the detailed operation of the more inventive aspects of the circuit shown in FIG. 2, it should be initially noted that sensing resistor 60 is coupled in series with secondary winding 45 of high voltage transformer 43. As described above, high voltage transformer 43 functions essentially as the power supply for operating CRT beam 11. As is also mentioned above, the current drawn from high voltage transformer 43 is related directly to the intensity of CRT beam current. Thus, the current supplied by high voltage transformer 43 in response to CRT beam current is carried by secondary winding 45 and thus passes through sensing resistor 60. Capacitor 61 functions to partially filter high frequency transients and the like from the voltage established across resistor 60. As a result, the voltage developed across resistor 60 constitutes an error signal indicative of the intensity of CRT beam current within CRT 11. This voltage is applied to base 72 of PNP transistor 70. Transistor 70 amplifies the applied error signal and couples it via resistor 116 to gate electrode 112 of field effect transistor 110. In addition, the signal applied to base 72 of transistor 70 is also coupled via emitter 71 to base 82 of transistor 80. Thus, transistor 80 also amplifies the applied error signal and couples it to gate electrode 112 of field effect transistor 110 through resistor 116. Thus, a voltage is applied to gate electrode 112 of field effect transistor 110 which varies directly with changes of CRT beam current intensity. Resistor 105 is coupled in series with vertical yoke 22 and the parallel combination of capacitors 103 and 104. Thus, the currents flowing within vertical yoke 22 and resistor 105 establish a vertical rate voltage across resistor 105 which comprises a sample of the vertical scan signal. This signal is coupled through field effect transistor 110 to vertical amplifier 101 and comprises a negative feedback signal. In accordance with conventional fabrication techniques, the application of a negative feedback signal to vertical amplifier 101 is provided in a manner which improves the linearity of vertical scan signal produced by vertical oscillator 100 and sets the AC gain of vertical amplifier 101. The separate AC gain variation of amplifier 101 as a separate loop from the vertical oscillator permits the size regulation to respond more quickly.

In accordance with an important aspect of the present invention, the degree of coupling of the negative feedback signal established across resistor 105 to vertical amplifier 101 is controlled by the conduction level of field effect transistor 110. In essence, field effect transistor 110 functions as a variable resistor which is controlled by the voltage established at gate 112. Because the voltage applied to gate 112 by transistors 70 and 80 varies directly with CRT beam current, the degree of negative feedback applied to vertical amplifier 101 is controlled in accordance with CRT beam current. Thus, as CRT beam currents increase, an increased voltage is established across resistor 60 which is amplified by transistor 70 and 80 to produce an increased voltage at gate 112. The increased voltage at gate 112 in turn increases the conduction of field effect transistor 110 and couples an increased negative feedback signal to vertical amplifier 101. In response to increased negative feedback signal, vertical amplifier 101 produces a reduced amplitude vertical scan signal which results in maintaining vertical image size despite increased CRT beam current. Conversely, in the event CRT beam current intensity decreases, a reduced voltage is developed across resistor 60 and applied to gate 112 by transistors 70 and 80. With a reduction of voltage at gate 112, the conduction of field effect transistor 110 decreases reducing the amount of negative feedback signal applied to vertical amplifier 101. With reduced negative feedback signal applied, vertical amplifier 101 produces an increased amplitude vertical scan signal which compensates for decreased CRT beam current. In addition to the CRT beam current responsive voltage applied to gate 112 of field effect transistor 110, an adjustable DC voltage is coupled from potentiometer 118 to gate 112 by resistor 117. This DC voltage provides a vertical bias setup control for the vertical deflection system which assures proper tracking despite variations of MOSFET characteristics.

In addition to coupling the applied beam current indicative signal to gate 112, transistors 70 and 80 function as successive emitter follower stages to couple the beam current indicating signal to base 92 of transistor 90 via zener diode 76 and resistor 94. The beam current error signal at base 92 is coupled by transistor 90 to horizontal size control 63. As mentioned above, horizontal size control 63 may comprise any of a number of size controls which respond to the voltage at emitter 91 to produce corresponding changes in the amplitude of deflection current within yoke 23. As is also mentioned above, it has been found advantageous to construct horizontal size control 63 in accordance with the circuitry set forth in the above-referenced incorporated application. As is set forth therein, horizontal size control is accomplished by application of a diode modulator and modulating inductance to horizontal yoke 23. A DC controlled amplifier establishes the operational level of the diode modulator to control the amplitude of horizontal scan signals within the horizontal deflection yoke. Accordingly, as CRT beam current increases, an increased voltage is developed across resistor 60 which is coupled by transistors 70, 80 and 90 to horizontal size control 63 to reduce the amplitude of deflection current within yoke 23. Conversely, as CRT beam current decreases, a reduced voltage is developed across resistor 60 which is coupled via transistors 70, 80 and 90 to horizontal size control 63 to produce increased amplitude deflection currents within horizontal yoke 23. In addition, a DC voltage is applied to base 92 of transistor 90 by variable resistor 97 and resistor 96 to provide a static or DC voltage to properly set-up the operation of transistor 90 and horizontal size control 63.

What has been shown is a display monitor image size regulation system in which the CRT beam current is sensed by detecting the current within the secondary winding of the high voltage transformer to produce an error signal. This error signal is processed to provide control of the amplitudes of horizontal and vertical deflection currents and thereby compensate for CRT beam current changes.

While particular embodiments of the invention have been shown and described, it will be obvious to those skilled in the art that changes and modifications may be made without departing from the invention in its broader aspects. Therefore, the aim in the appended That which is claimed is:

1. For use in a display system having a cathode ray tube in which an intensity modulated electron beam is directed toward a display screen, vertical deflection means including a vertical deflection yoke for producing vertical deflection currents within the vertical deflection yoke, horizontal deflection means including a horizontal deflection yoke for producing horizontal deflection currents within the horizontal deflection yoke, and high voltage means for producing an electron beam accelerating potential and having a high voltage transformer including primary and secondary windings, image size regulation means comprising:
   sensing means for producing a control signal indicative of electron beam intensity;
   horizontal size control means coupled to the horizontal deflection yoke;
   amplifying means having an input coupled to said sensing means and an output coupled to said horizontal size control means;
   vertical feedback means including a resistor coupled in series with the vertical deflection yoke for producing a vertical feedback signal related to the vertical deflection current within the vertical deflection yoke; and
   a variable impedance coupling element including a variable conduction amplifier for coupling said vertical feedback signal to the vertical deflection means in a manner affecting the amplitude of vertical deflection signal produced by the vertical deflection means in response to said control signal, said variable conduction amplifier including a field effect transistor having a source electrode coupled to said feedback resistor, a drain electrode coupled to the vertical deflection means, and a gate electrode coupled to said output of said amplifying means.

2. Image size regulation means as set forth in claim 1 wherein said vertical feedback signal forms a negative feedback.

3. Image size regulation means as set forth in claim 2 wherein said variable impedance element includes a variable DC voltage source coupled to said gate electrode of said field effect transistor.

4. Image size regulation means as set forth in claim 3 wherein said sensing means includes a sensing resistor in series with the secondary winding of the high voltage transformer and wherein said amplifying means includes:
   a first transistor having a first base coupled to said sensing resistor, a first emitter, and a first collector coupled to said gate electrode;
   a second transistor having a second emitter, a second base coupled to said first emitter and a second collector coupled to said first collector; and
   a third transistor having a third emitter coupled to said horizontal size control means, a third base coupled to said second emitter and a third collector.

5. For use in a display system having a cathode ray tube in which an intensity modulated electron beam is directed toward a display screen, vertical deflection means including a vertical deflection yoke for producing vertical deflection currents within the vertical deflection yoke, horizontal deflection means including a horizontal deflection yoke for producing horizontal deflection currents within the horizontal deflection yoke, and high voltage means for producing an electron beam accelerating potential and having a high voltage transformer including primary and secondary windings, image size regulation means comprising:
   sensing means including a sensing resistor in series with the secondary winding of said high voltage transformer for producing a control signal indicative of electron beam intensity;
   horizontal size control means coupled to the horizontal deflection yoke;
   amplifying means having a first transistor having a first base coupled to said sensing resistor, a first emitter, and a first collector coupled to said gate electrode, a second transistor having a second emitter, a second base coupled to said first emitter and a second collector coupled to said first collector, and a third transistor having a third emitter coupled to said horizontal size control means, a third base coupled to said second emitter and a third collector;
   vertical feedback means including a resistor coupled in series with the vertical deflection yoke for producing a vertical feedback signal related to the vertical deflection current within the vertical deflection yoke; and
   a variable impedance coupling element including a variable conduction amplifier output for coupling said vertical feedback signal to the vertical deflection means in a manner affecting the amplitude of vertical deflection signal produced by the vertical deflection means in response to said control signal.

* * * * *